United States Patent [19] [11] 4,371,641
Boyer et al. [45] Feb. 1, 1983

[54] BITUMEN-CONTAINING EXTENDED COMPOSITIONS

[75] Inventors: Gerard A. M. Boyer, Notre Dame de Bondeville, France; Ilan Duvdevani, Leonia, N.J.; Jean-Marie A. Muller, Bihorel, France

[73] Assignee: Exxon Research and Engineering Co., Florham Park, N.J.

[21] Appl. No.: 333,127

[22] Filed: Dec. 21, 1981

[51] Int. Cl.$^3$ .............................................. C08L 95/00
[52] U.S. Cl. ........................................ 524/70; 524/71; 524/425; 524/445; 524/451; 524/442; 524/436; 524/547
[58] Field of Search ................ 524/70, 71, 425, 445, 524/451, 442, 436, 547

[56] References Cited

U.S. PATENT DOCUMENTS 4,085,078  4/1978  McDonald ........................... 524/70
4,091,134  5/1978  Uemura et al. ..................... 524/70
4,158,688  1/1979  Pett et al. .......................... 524/70

Primary Examiner—Melvyn I. Marquis
Attorney, Agent, or Firm—Richard E. Nanfeldt

[57] ABSTRACT

The instant invention relates to improved roofing materials which are a blend composition of a bitumen, a neutralized sulfonated polymer, and a filler, wherein the concentration level of the neutralized sulfonated polymer is about 5 to about 25 parts by weight per 100 parts by weight of the bitumen, more preferably about 7 to about 20, and the concentration level of the filler is about 0 to about 100 parts by weight per 100 parts of the bitumen. The improved roofing material based on such a composition has excellent stability towards oxidation, is U.V. stable and has good resistance to creep.

11 Claims, 2 Drawing Figures

BITUMEN-CONTAINING EXTENDED COMPOSITIONS

FIELD OF THE INVENTION

This invention relates to bitumen compositions which contain neutralized sulfonated polymers and fillers which modify the properties of bitumen.

Various industries, especially the roofing industry, require bitumen which has a good resistance to creep, as well as having elastic properties. In the past, polymers (usually styrene-butadiene copolymers) have been added to bitumen to achieve these properties. However, such blends have been found to have a reduced stability towards oxidation and are sensitive to U.V. radiation with the result that they age rather quickly.

We have now discovered compositions which have good resistance to creep without having the abovementioned disadvantages of the prior art compositions.

According to this invention, a bitumen-containing composition comprises bitumen, a filler, and a minor proportion by weight of a polymer having one or more neutralized sulfonated groups attached thereto.

Bitumen, i.e., bituminous crude petroleum residue, remaining after removal of volatile constituents of crude petroleum, usually by distillation. This distillation is normally conducted at atmospheric pressure followed by reduced pressure treatment. The bituminous residue remaining after the reduced pressure treatment is referred to as a vacuum residue.

Bitumen is commonly classified by penetration grade. The penetration of bitumen is a measure of its resistance to deformation and is the depth expressed in 0.1 mm., a needle of standardized dimensions penetrates under standardized conditions into this bitumen. The values of the penetration mentioned in this specification are those determined by means of ASTM method D-5. Bitumens having a penetration ranging from 5 to 200 at 25° C. may be regarded as relatively hard. Preferred bitumens for use in the compositions of this invention have penetration of 100 to 300 at 25° C., e.g., 200 at 25° C.

The penetration index of a bitumen indicates the temperature susceptibility of the penetration and is calculated from the slope of the decimal logarithm of the penetration versus the temperature in °C. The higher the penetration index, the lower the temperature susceptibility. The compositions of this invention have greatly improved penetration index compared with the bitumen before the incorporation therein of the elastic polymer.

SUMMARY OF THE INVENTION

The instant invention relates to a blend composition of a bitumen, a neutralized sulfonated polymer, and a filler, wherein the concentration level of the neutralized sulfonated polymer is about 5 to about 25 parts by weight per 100 parts by weight of the bitumen, more preferably about 10 to about 20, and the concentration level of the filler is less than about 100 parts by weight per 100 parts of the bitumen, more preferably about 10 to about 50.

Accordingly, it is an objective of the instant invention to provide an improved roofing material which has excellent stability towards oxidation, is U.V. stable and has good resistance to creep.

GENERAL DESCRIPTION OF THE INVENTION

The instant invention relates to a blend composition of a bitumen, a neutralized sulfonated polymer and a filler, wherein the concentration level of the neutralized sulfonated polymer is about 5 to about 25 parts by weight per 100 parts by weight of the bitumen, more preferably about 7 to about 20, and the concentration level of the filler is less than about 100 parts by weight per 100 parts of the bitumen, more preferably about 10 to about 50.

The neutralized sulfonated polymers of the instant invention are derived from either thermoplastic or elastomeric polymers having either olefinic or aromatic unsaturation sites. In particular, unsaturated elastomeric polymers include low unsaturated polymers such as Butyl rubber and EPDM, and high unsaturation polymers such as polybutadiene and polyisoprene. In addition to these elastomers, suitable sulfonic acid-containing copolymers may be prepared from plastic polymers prepared by the polymerization of ethylene or propylene with multiolefins such as 1,4-hexadiene, dicyclopentadiene, norbornadiene, 5-methylene-2-norbornene, 5-ethylidene-2-norbornene, 5-propenyl-2-norbornene and 1,5-cyclooctadiene. Preferably, these polymers have incorporated therein about 0.2 to about 10 mole percent unsaturation; more preferably about 0.5 to about 6 percent. An example of these plastic-like polymers is a product containing about 90 mole percent ethylene, about 6 mole percent propylene, and about 4 mole percent of diene monomer. The high ethylene content of these systems provides a more plastic-like material than the EPDM rubbers discussed below. The preferred polymers are based on EPDM.

Though the term "olefinic unsaturation" does not include aromatic unsaturation, the polymer backbone may contain aromatic rings either within the backbone structure or pendant therefrom. Sulfonation, however, is preferentially carried out at the site of olefinic unsaturation rather than on the aromatic rings.

The term "EPDM" is used in the sense of its definition as found in ASTM D-1418-64, and is intended to mean a terpolymer containing ethylene and propylene in the backbone, and unsaturation in the side chain. Illustration methods for producing these terpolymers are found in U.S. Pat. No. 3,280,082, British Pat. No. 1,030,289 and French Pat. No. 1,386,600, herein incorporated by reference. The preferred polymers contain about 45 to about 80 weight percent ethylene and about 1 to about 10 weight percent of a diene monomer, the balance of the polymer being propylene. Preferably, the polymer contains about 50 to about 70 weight percent ethylene, e.g., about 60 weight percent and about 1.0 to about 8.0 weight percent diene monomer, e.g., 4.5 weight percent. The diene monomer is preferably a non-conjugated diene.

Examples of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1+8, 100° C.) of about 40 and having an ethylene content of about 40 weight percent and a 5-ethylidene-2-norbornene content of about 5.0 weight percent. The $\overline{M}n$ of Vistalon 2504 as measured by GPC is about 47,000, the $\overline{M}v$ as measured by GPC is about 145,000 and the $\overline{M}w$ as measured by GPC is about 174,000.

The EPDM terpolymers used in the compositions of this invention usually have a number average molecular weight ($\overline{M}n$) as measured by GPC of about 10,000 to about 200,000 more preferably about 15,000 to about 100,000, for example, about 20,000 to about 60,000. The Mooney viscosity (ML, 1+8, 100° C.) of the EPDM terpolymer is usually about 5 to about 60, preferably about 10 to about 50, for example, about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

Typical representative examples of thermoplastic polymers useful in the present invention include sulfonated polystyrene, sulfonated polytertiary butylstyrene or sulfonated poly-α-methylstyrene. Preferably, the thermoplastic to be sulfonated will be polystyrene.

To sulfonate the polymer, the elastomeric or thermoplastic polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. A sulfonating agent is added to the solution of the elastomeric polymer and a non-reactive solvent at a temperature usually of $-100°$ C. to 100° C. for a period of time of about 1 to 60 minutes. Suitable sulfonating agents, as disclosed in U.S. Pat. Nos. 3,042,728 and 3,836,522, which are hereby incorporated by reference, are acyl sulfonates, a mixture of sulfuric acid and an acid anhydride or a complex of a sulfur trioxide donor and a Lewis base containing oxygen, sulfur, or phosphorus. Typical sulfur trioxide donors are SO$_3$, chlorosulfonic acid, sulfuric acid and oleum. Typical Lewis bases are dioxane, tetrahydrofuran, tetrahydrothiophene and triethylphosphate. The most preferred sulfonation agent is an acyl sulfate, for example, benzoyl, acetyl, propionyl or butyrl sulfate.

The sulfonating agent and the manner of sulfonation are not critical provided that the sulfonation does not degrade the polymeric backbone. The reaction mixture may be quenched with an aliphatic alcohol such as methanol, ethanol, isopropanol with an aromatic hydroxyl compound, such as phenol, a cycloaliphatic alcohol such as cyclohexanol or with water. The unneutralized sulfonated polymer usually has about 5 to about 100 millimole equivalents (meq.) of sulfonate groups per 100 grams of sulfonated polymer, more preferably about 10 to about 50, for example, about 15 to about 40 meq. sulfonate groups per 100 grams. The meq. of sulfonate groups per 100 grams of polymer may be determined by both titration of the polymeric sulfonic acid and Dietert Sulfur analysis.

Neutralization of the unneutralized sulfonated polymer may be the addition of a solution of a salt of a carboxylic acid, for example, a metal acetate, to the unneutralized sulfonated polymer dissolved in the reaction mixture, e.g., of the aliphatic alcohol and non-reactive solvent. The carboxylate may be dissolved in a binary solvent system consisting of water and an aliphatic alcohol. Examples of suitable acetates are sodium acetate, barium acetate, magnesium acetate, aluminum acetate, potassium acetate, lead acetate and zinc acetate. Zinc acetate is preferred.

Suitable counterions for the neutralization of the sulfonate groups are selected from the group consisting of ammonium, antimony, aluminum, iron, lead and Groups IA, IIA, IB and IIB of the Periodic Table of Elements. Organic amines are also suitable neutralizing agents.

Sufficient carboxylate is added to the solution of the unneutralized sulfonated polymer to neutralize the sulfonate groups. It is preferable to neutralize at least about 95 percent of the sulfonate groups, more preferably about 98 percent and most preferably about 100 percent of the sulfonate groups.

A particularly preferred neutralized polymer for this invention is a zinc neutralized EPDM terpolymer containing about 75 weight percent ethylene, about 20 weight percent propylene and about 5 weight percent of 5-ethylidene-2-norbornene with a sulfonation level of about 20 meq. sulfonate groups per 100 grams of sulfonated polymer.

The neutralized sulfonated polymer is incorporated in the bitumen-containing composition in minor proportion by weight, preferably about 5 to about 25 parts by weight per 100 parts by weight of the bitumen, for example, about 10 parts by weight.

EXTENDED BLEND COMPOSITION

To the blend compositions of the bitumen and the neutralized sulfonated polymer is added at least one filler which is selected from the group consisting of talcs, ground calcium carbonate, water precipitated calcium carbonate, delaminated, calcined or hydrated clays, silicas, ground slate stone or other ground minerals and carbon blacks, and mixtures thereof. These fillers are incorporated into the blend composition at about 0 to about 100 parts by weight per 100 parts by weight of the bitumen, more preferably at about 10 to about 50; and more preferably at about 20 to about 35. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code No. | Oil Absorption gms. of oil/100 gms. of filler | Specific Gravity | Average Particle Size Micron | pH |
|---|---|---|---|---|---|
| Calcium Carbonate Ground | Atomite | 15 | 2.71 | 2–10 | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |

TABLE I-continued

| Filler | Code No. | Oil Absorption gms. of oil/100 gms. of filler | Specific Gravity | Average Particle Size Micron | pH |
|---|---|---|---|---|---|
| Magnesium Silicate | Mistron Vapor | 60–70 | 2.75 | 2 | 9.0–7.5 |
| Ground Silica Quarzmehl (in Germany) | | 30 | 2.32–2.65 | 1–10 | 6.5–7.5 |

The bitumen, neutralized sulfonated polymer and fillers are readily blended by techniques well-known in the art. At elevated temperatures, when the bitumen viscosity is low, a propeller or turbine mixer can be used. For higher viscosity, a ribbon blender or other blenders that are used for viscous materials can be used. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer, e.g., a Banbury mixer. Alternatively, economic advantages, in terms of time and labor savings, can be obtained through the use of a Farrel Continuous Mixer, a twin screw extruder, or tandem extrusion techniques, which are continuous mixing types of equipment.

It has been found that, compared with bitumen alone, the composition of the invention has increased softening point and, in fact, softening points of greater than 100° C. can be achieved. Also, the penetration index is greatly improved. Also, it has been found that the compositions of the invention have penetrations close to those of oxidized bitumens.

Furthermore, it has been found that the elastic recovery after stretching is good and, in fact, recoveries as high as 95 percent have been achieved. This compares with conventional oxidized bitumens which have no elastic recoveries. However, the presence of the neutralized sulfonated polymer in the composition does increase the viscosity, but the latter is low enough at normal processing temperatures.

Also, it has been observed that at high strains, e.g., of the order of 300 percent, the compositions of this invention are not destroyed and the developed strength is characteristic of a flexible product.

DESCRIPTION OF THE PREFERRED EMBODIMENTS OF THE INVENTION

EXAMPLE I

Figure 1:
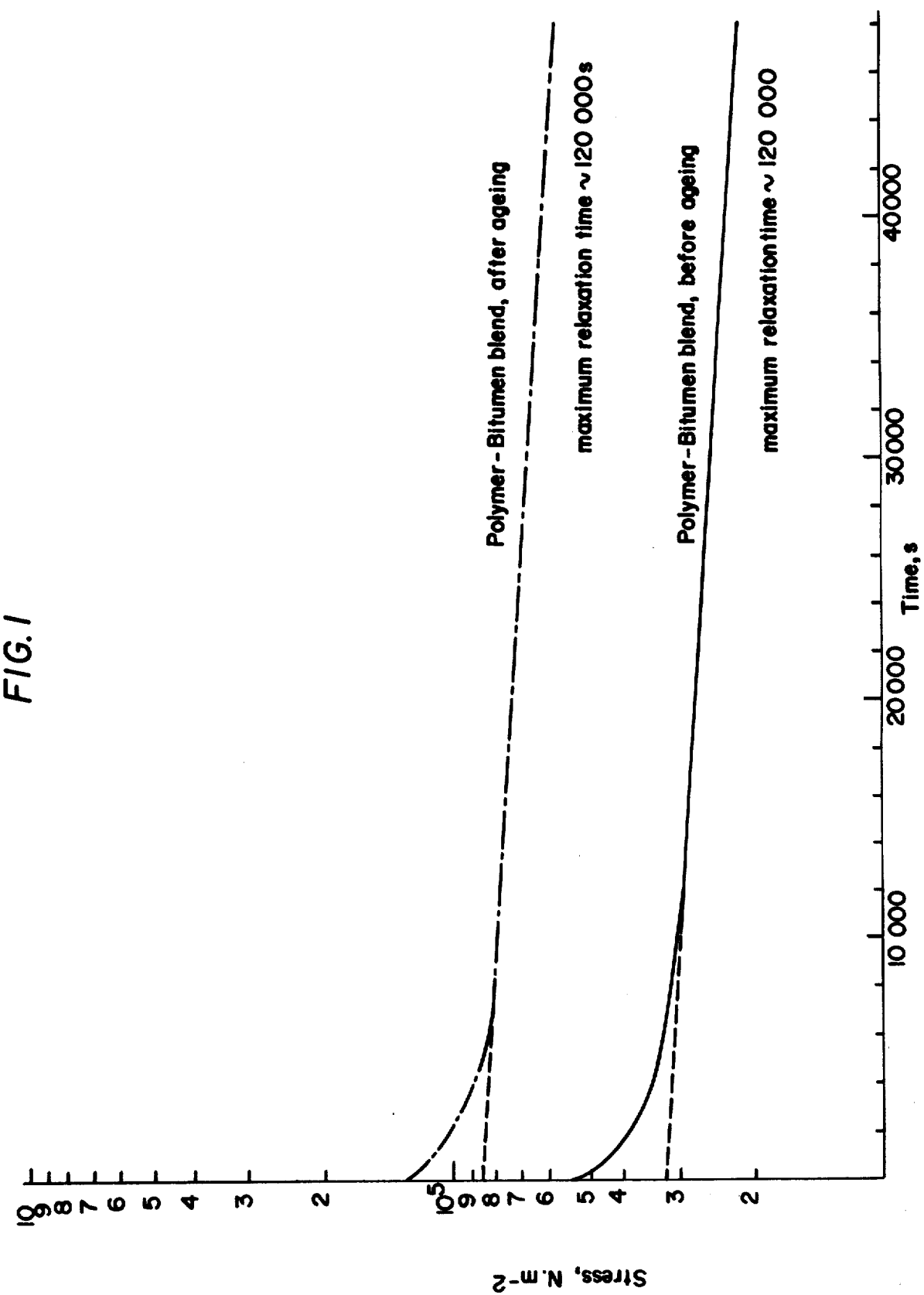

A blend of 90 weight percent Aramco bitumen (200 penetration grade) and 10 weight percent of a zinc neutralized sulfonated polymer was prepared by mixing with a high-speed turbine mixer at 190° C.

The polymer was a copolymer containing 75 weight percent of ethylene, 20 weight percent of propylene and 5 weight percent of 5-ethylidene-2-norbornene sulfonated by the procedure, as described in U.S. Pat. No. 3,836,511, to a level of 20 millimoles $SO_3H$ groups per 100 grams polymer, which was neutralized with zinc acetate.

The following table shows the properties of the blend of the invention compared with bitumen alone and a conventional oxidized bitumen.

TABLE II

| | Pure Aramco Bitumen | Aramco Bitumen + 10% Polymer | Oxidized Bitumen |
|---|---|---|---|
| Softening Point °C. | 42 | 88 | 102 |
| Penetration 25° C., 100 g .1 mm | 139 | 42 | 39 |
| Penetration Index | −1.2 | 3.4 | 5.0 |
| % Elastic Recovery after a 50% strain | 0 | 80 | Broken |
| Viscosity 160° C., 30 $s^{-1}$ m Pa.s | 100 | 3200 | 7500 |
| Tensile Stress at 300% strain, $kN.m^{-2}$ | less than 5 | 250 | Broken |

The following outlines the experimental procedures used for measuring properties of polymer bitumen blends:

| EXPERIMENTAL PROCEDURES | |
|---|---|
| Softening Point: | measured according to ASTM D-36. |
| Penetration: | measured according to ASTM D-5. |
| Penetration Index: | calculated from the slope of the decimal logarithm of the penetration, vs. temperature. |
| Elastic Recovery: | A 2 mm thick strip of polymer-bitumen blend is subjected to a 50 percent elongation during 24 hours. The recovery, after the following 24 hours of rest, is expressed as a percentage of the imposed strain. A perfectly rubbery product has a 100 percent recovery, whilst a viscous one yields a 0 percent recovery. |
| Viscosity: | measured with a coaxial cylinder system (Contraves Rheomat 30) viscosity is given at a 30 $s^{-1}$ shear rate only; this shear rate can be considered as representative of shear rate occurring in manufacturing equipment. |
| Tensile properties: | A strip, 2 mm thick and 5 cm long is stretched (450 mm/mm) until it breaks; the tensile stress is continuously recorded. |
| Stiffness Modulus: | Measured with the ENRAF-NONIUS sliding plate rheometer. |
| Relaxation Experiments: | performed on 2 mm thick strips, subjected to a 50 percent tensile strain. The decay of the stress is recorded, and the calculated relaxation time is the "maximum relaxation time", as described by A. V. Tobolsky in his book "Properties and Structure of Polymers" (J. Wiley, 1960). |
| Aging: | it is performed by storing a sheet of the polymer-bitumen blend in a ventilated oven, at 70° C., for 6 months. |

In FIG. 1, the stiffness modulus for the composition of this example is plotted against loading time. At high loading time, the curve tends to level off towards a so-called rubbery plateau and this means that creep will stop at long loading times; hence, the blend exhibits elastic behavior. For a bitumen that is not modified, the stiffness modulus will continuously decrease.

Figure 2:
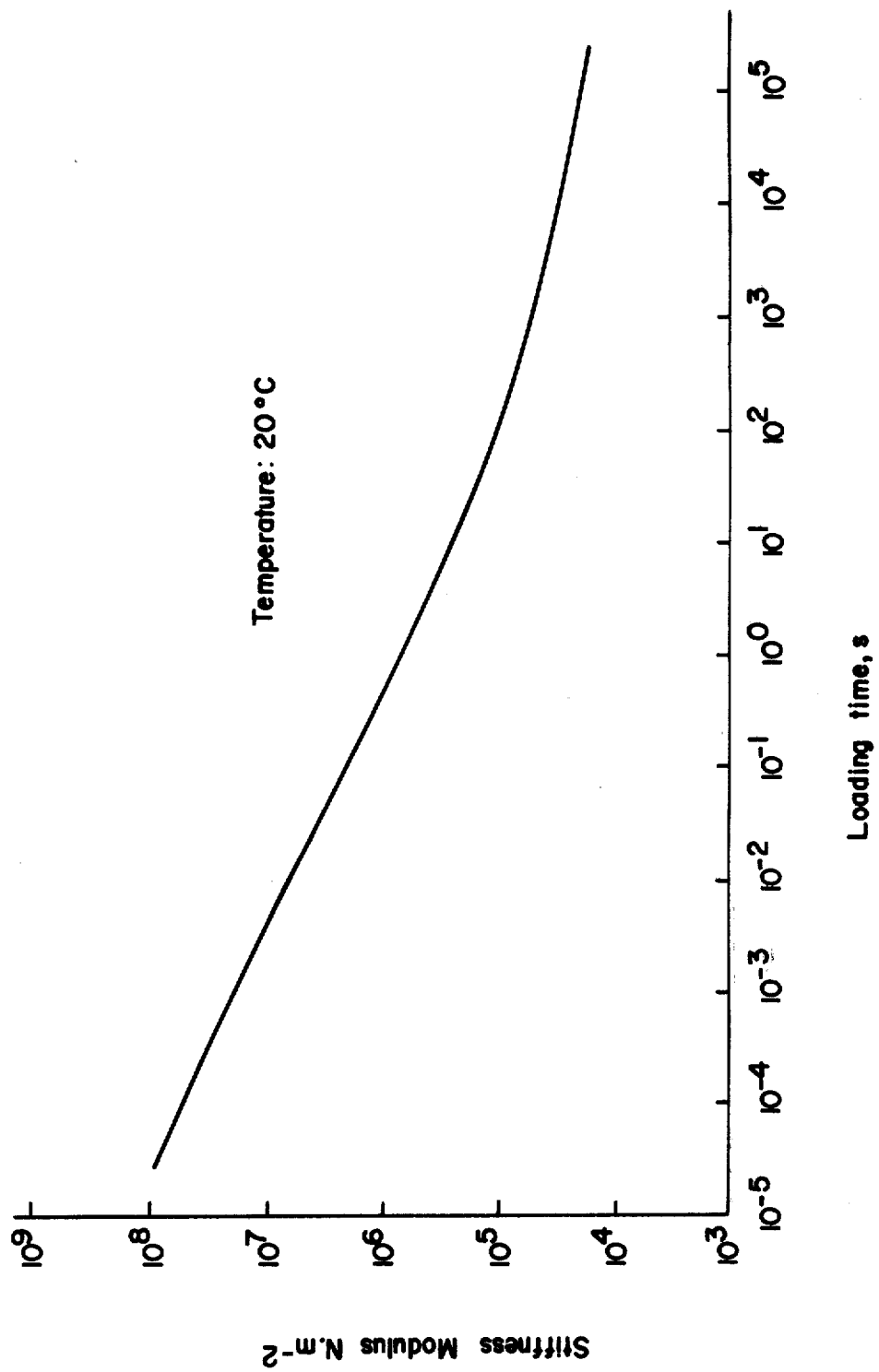

In FIG. 2, relaxation stress is plotted against time for the composition of this example. From this it can be seen that the loss of tensile stress is very slow after a few thousand seconds. Also, good aging behavior is exhibited in terms of stress relaxation. The shift of the tensile stress to higher values after aging is merely a slight hardening of the polymer-bitumen blend. The equal value of relaxation time before and after aging (about 120,000 sec.) means that no major alteration of the polymer occurred during aging. Stress of a non-modified bitumen will continue to relax at a much higher rate.

The results shown in Table II and in FIGS. 1 and 2 indicate a significant improvement in the elastic properties and load carrying capability of the composition in this example over a non-modified bitumen. Aging for this sample is shown to be non-destructive, unlike other elastic compositions known in the art (e.g., blends with styrene-butadiene block copolymers).

EXAMPLE II

The zinc neutralized sulfonated EPDM and bitumen described in Example I were blended with ground silica to prepare these filler extended compositions. The polymer and bitumen were first blended as in Example I at a ratio of 90:10 bitumen to polymer using a high shear turbin mixer at 200° C. After the blend appeared homogeneous, the temperature was raised to 210° C. and ground silica was added while blending was maintained. Blends of various levels of filler were prepared as shown in Table III, keeping a fixed ratio of bitumen to polymer (90:10).

TABLE III

| Ground Silica, wt. % | 0 | 10 | 20 | 30 |
|---|---|---|---|---|
| Softening Point °C. | 104 | 101 | 101 | 108 |
| Penetration at 25° C. and 100 g, 0.1 mm | 35 | 32 | 30 | 26 |
| % Elastic Recovery after 50% Strain | 87 | 80 | 83 | 70 |
| Stiffness Modulus at 20° C. after 1 sec. loading, N.m$^{-2}$ × 10$^{-5}$ | 3.7 | 9.9 | 22 | 32 |
| 1000 sec. loading, N.m$^{-2}$ × 10$^{-5}$ | 0.32 | 0.83 | 1.7 | 2.6 |
| ratio of above values | 11.6 | 11.9 | 12.9 | 12.3 |

All the compositions include bitumen to polymer at a ratio of 90:10. Test procedures described in Example I.

From Table III, it can be seen that some critical properties, such as elastic recovery and softening point, are maintained when filler is added at the shown level, which is desirable and unexpected. Hardness or stiffness, as shown by penetration and stiffness modulus, do increase but this is not critical to products such as roofing products, in view of the maintained elasticity and the capability of maintaining the stress under long loading times.

It should be noted that the mixing procedure described in Example II is not essential for obtaining the described properties. The sequence of filler addition can be changed with little or no effect on properties.

What is claimed is:

1. A bitumen-containing composition which comprises:
   (a) bitumen;
   (b) about 5 to about 25 parts by weight of a neutralized sulfonated polymer per 100 parts by weight of the bitumen; and
   (c) about 0 to about 100 parts by weight of a filler per 100 parts by weight of the bitumen.

2. A composition according to claim 1, wherein such neutralized sulfonated polymer has about 5 to about 50 meq. of sulfonate groups per 100 grams of said neutralized sulfonated polymer, at least 95 percent of said sulfonate groups being neutralized with a counterion being selected from the group consisting of aluminum, iron, antimony, lead, ammonium and Groups IA, IIA, IB and IIB of the Periodic Table of Elements.

3. A composition according to claim 1 or 2 wherein the polymer is an elastomeric polymer.

4. A composition according to claim 1 or 2 wherein the polymer is a copolymer of ethylene, propylene and a diene.

5. A composition according to claim 4 wherein the copolymer comprises 45 to 80 weight percent ethylene, 1 to 10 weight percent of a diene and the balance propylene.

6. A composition according to claims 1, 2 or 5 wherein the polymer is a zinc neutralized sulfonated polymer.

7. A composition according to claims 1, 2 or 5 wherein said filler is selected from the group consisting of talcs, clays, calcium carbonate, silicas, ground slate stone or other ground minerals and carbon black and mixtures thereof.

8. A composition according to claim 3, wherein said polymer is a Butyl rubber.

9. A composition according to claim 1 or 2 wherein said polymer is a thermoplastic resin.

10. A composition according to claim 1 or 2 wherein said polymer is polystyrene.

11. A composition according to claim 1 wherein the bitumen has a penetration of about 100 to about 300 at 25° C.

* * * * *